United States Patent [19]
Gal

[11] 3,737,177
[45] June 5, 1973

[54] FRONT TOW HITCH FOR SMALL CARS

[76] Inventor: Martin Gal, 1206 Burcham Drive, East Lansing, Mich. 48823

[22] Filed: Aug. 26, 1971

[21] Appl. No.: 175,272

[52] U.S. Cl. .................. 280/495, 280/491, 280/493
[51] Int. Cl. .............................................. B60d 1/00
[58] Field of Search ............... 280/402, 491 R, 491 E, 280/491 B, 493, 494, 495, 496, 500, 505; 293/60, 65

[56] References Cited

UNITED STATES PATENTS

| | | | |
|---|---|---|---|
| 3,455,574 | 7/1969 | Priefert | 280/491 D |
| 3,501,169 | 3/1970 | Nutt | 280/491 R |
| 3,510,146 | 5/1970 | Hartman | 280/491 E |
| 3,664,687 | 5/1972 | Nutt | 280/402 X |

FOREIGN PATENTS OR APPLICATIONS

| | | | |
|---|---|---|---|
| 696,452 | 10/1930 | France | 280/490 R |

Primary Examiner—Leo Friaglia
Assistant Examiner—Reinhard Eisenzopf
Attorney—Austin A. Webb

[57] ABSTRACT

A frame consisting of laterally spaced side members with upturned front ends and connected by cross members has upturned rear hanger straps arranged to pass under and behind a lower torsion bar of the front wheel suspension of a small car. The upper ends of the hanger bars curve forwardly to engage over the top of the upper torsion bar of the suspension. L-shaped bolts pass through the hanger bars above and below the torsion bar to clamp the hanger bars to the bottom of the side members and secure the frame to the torsion bar. Thrust plates secured to the side member engage the front of the torsion bar. A towing hitch is pivotally connected to the upper ends of the L-shaped side members.

2 Claims, 3 Drawing Figures

PATENTED JUN 5 1973

3,737,177

INVENTOR.
MARTIN GAL
BY Austin P. Webb
ATTORNEY.

FRONT TOW HITCH FOR SMALL CARS

OUTLINE OF INVENTION

The hitch assembly is designed especially for connection to small foreign cars sold under the trademark VOLKSWAGEN. It provides a rigid, two-way, thrust connection directly to the lower torsion bar of the vehicle with a selectively vertically adjustable horizontal pivotal connection of a tow bar at a level substantially above the lower torsion bar and in front of the standard bumper of the vehicle. This permits the tow bar to extend horizontally to a hitch connection on a standard size American automobile. The elevated front end of the frame of the invention also acts as an auxiliary front bumper for the vehicle to which it is attached.

DESCRIPTION

The drawings, of which there is one sheet, illustrate a preferred form of the towing hitch.

Figure 1:
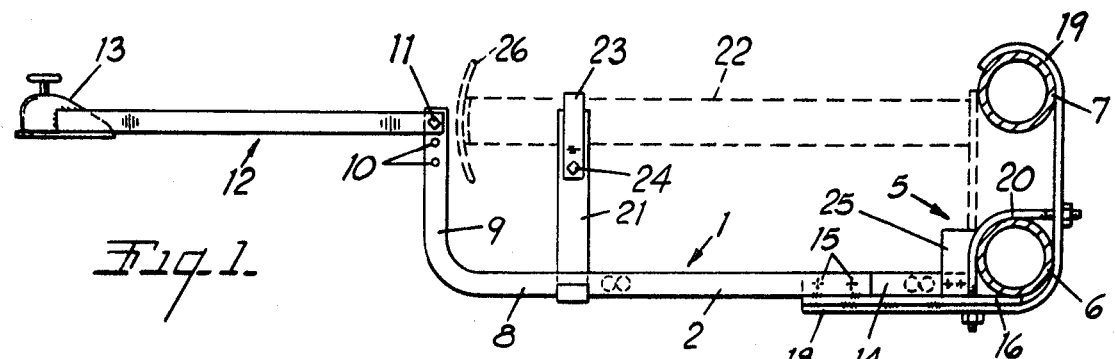
FIG. 1 is a side elevational view of the hitch attached to the vehicle, with parts of the vehicle shown in dotted lines.
Figure 2:
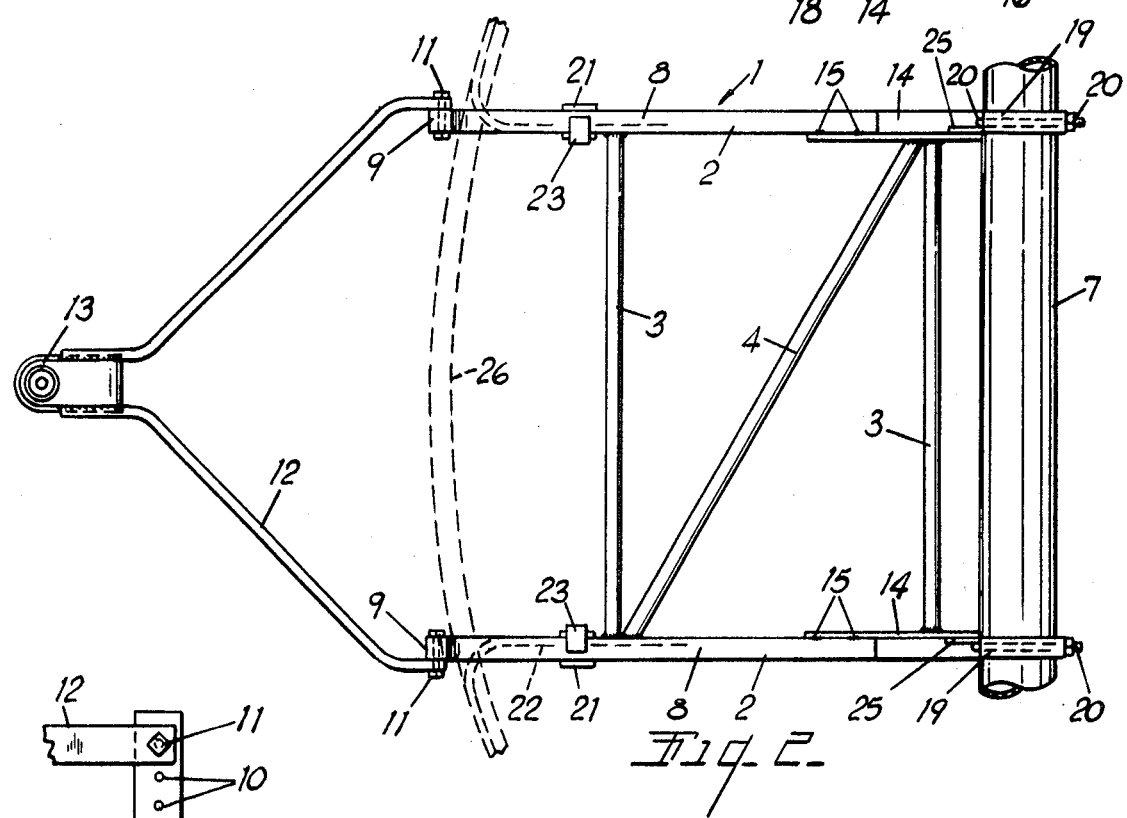
FIG. 2 is a top plan view of the hitch.
Figure 3:
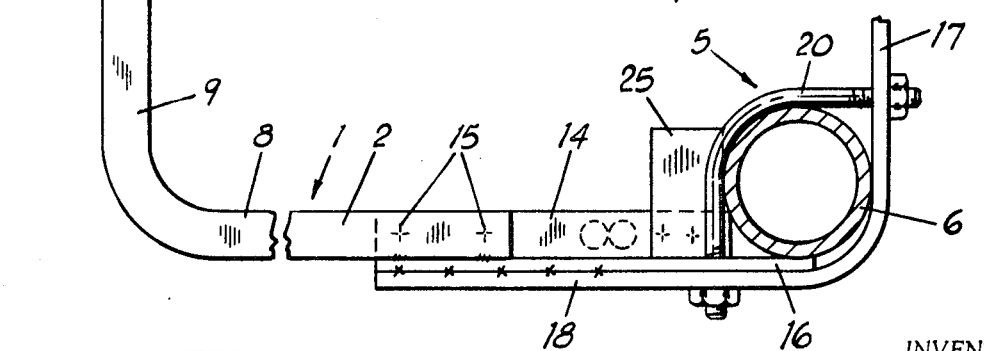
FIG. 3 is a fragmentary, enlarged, side elevational view of the connection of the hitch to the vehicle.

The hitch consists of a generally horizontal frame 1 having side members 2 connected by cross bars 3 and a diagonal brace 4. A rear hanger assembly generally indicated at 5 connects to the torsion bars 6 and 7 of the vehicle as will be described in greater detail presently. The side members 2 have front portions 8 of heavy rectangular cross section with upturned forward ends 9. A series of vertically spaced holes 10 selectively receive bolts 11 for pivotally connecting the rear of a tow bar 12 to the hitch assembly. No claim is made to the details of the tow bar so it is noted only that it includes a socket 13 of common design for connection to a ball hitch on a towing vehicle.

The lower rear ends of the frame side members 2 are outwardly and upwardly facing angles 14 which are secured to the bottoms and sides of front sections 8 as by welding at 15. The lower flanges of the angles project under the lower torsion bar as at 16. The rear hanger assemblies 5 are metal straps 17 with forwardly projecting lower ends 18 welded to the bottom flanges of the angles 14. The straps curve upwardly behind the lower torsion bar and extend to forwardly turned hooks 19 that fit over the upper torsion bar 7. L shaped bolts 20 have upper arms passed through the upright portions of the straps and vertical arms that pass through the lower flanges of the angles and the lower ends of the straps. The bolts thus secure the lower ends of the straps to the side members and connect the rear of the frame to the torsion bar.

The hangers 17 support the frame 1 in forwardly projecting relation from the lower torsion bar, but to reinforce and stabilize the front end of the frame, front hangers 21 are provided. These are straps hooked under the bars 8 and extended upwardly to alongside of bumper support bars of the vehicle indicated by the dotted lines at 22. Connecting clips 23 hook over the bumper bars and are secured to the hangers by bolts 24. In order to strengthen the rearward thrust engagement between the frame 1 and the lower torsion bar, plates 25 are welded to the side flanges of angles 14 to bear against the torsion bar.

The frame 1 is thus securely fastened to the frame of the vehicle, with direct, two-way, thrust connection to the torsion bars which are as strong as any part of the body. The upturned front ends 9 of the heavy side bars are located in front of the regular bumper 26 of the vehicle where they function as auxiliary bumpers. The elevated position of the holes 10 permits connection of the tow bar 12 at the best elevation relative to the towing vehicle. The tow bar may be swung up temporarily when not in use; or it can be removed by removing the bolts 11 to leave the frame 1 connected to the vehicle. The frame thus functions as an auxiliary bumper and does not interfere with normal use of the vehicle when the tow bar is removed.

What is claimed as new is:

1. A towing hitch for a vehicle having vertically spaced and transversely extending front wheel supporting bars and a frame projecting forwardly of the bars, said hitch comprising
    a horizontal frame having side members projecting forwardly from the lowermost of said bars,
    upright hangers on the rear ends of said side members adapted to extend upwardly along the back of the lowermost of said bars and curved over the uppermost bar,
    bolt means securing said side members and hangers to the lowermost of said bars,
    upturned front ends on said side members projecting upwardly in front of said frame and having vertically spaced holes in their upper ends,
    and a tow bar having a socket at its front end and selectively pivotally connected to said upturned front ends of said side members by pins passed through said holes.

2. A hitch as defined in claim 1 in which said side members consist of forward parts including said upturned ends of solid generally square cross section,
    and rear ends on said side members of angle shaped cross section welded to said forward parts and to forwardly turned ends on said first hangers.

* * * * *